(12) United States Patent
Maruta

(10) Patent No.: US 12,457,397 B2
(45) Date of Patent: Oct. 28, 2025

(54) IMAGE CAPTURE APPARATUS AND CONTROL METHOD THEREOF

(71) Applicant: CANON KABUSHIKI KAISHA, Tokyo (JP)

(72) Inventor: Hiroki Maruta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 18/675,471

(22) Filed: May 28, 2024

(65) Prior Publication Data
US 2024/0406525 A1  Dec. 5, 2024

(30) Foreign Application Priority Data

May 31, 2023 (JP) ................. 2023-090208

(51) Int. Cl.
*H04N 23/52* (2023.01)
*B08B 7/02* (2006.01)
*H04N 23/65* (2023.01)
*H04N 23/667* (2023.01)

(52) U.S. Cl.
CPC .............. *H04N 23/52* (2023.01); *B08B 7/02* (2013.01); *H04N 23/65* (2023.01); *H04N 23/667* (2023.01)

(58) Field of Classification Search
None
See application file for complete search history.

(56) References Cited

U.S. PATENT DOCUMENTS

2012/0243093 A1* 9/2012 Tonar .............. H10N 30/20
359/507
2021/0179031 A1* 6/2021 Vitanov ............ H04N 23/811

FOREIGN PATENT DOCUMENTS

JP 4702954 B2 6/2011

* cited by examiner

*Primary Examiner* — James M Hannett
(74) *Attorney, Agent, or Firm* — Cowan, Liebowitz & Latman, P.C.

(57) ABSTRACT

An image capture apparatus capable of performing sensor cleaning for removing an unwanted object on an image capture plane of an image sensor is disclosed. The apparatus detects occurrence of an event accompanied by turning off a power. In a case where setting has been made such that the sensor cleaning is to be automatically performed when the power is turned off, if the event is a restart event, the apparatus performs restart processing without performing the sensor cleaning when the power is turned off, and if the event is not the restart event, the apparatus performs the sensor cleaning when the power is turned off.

10 Claims, 3 Drawing Sheets

IMAGE CAPTURE APPARATUS AND CONTROL METHOD THEREOF

BACKGROUND OF THE INVENTION

Field of the Invention

The present invention relates to an image capture apparatus and a control method thereof.

Description of the Related Art

There are known image capture apparatuses that remove sensor dust by vibrating a filter provided on a front surface of an image sensor, or the like, in order to prevent an unwanted object (sensor dust) on the image capture plane from appearing in an image (Japanese Patent No. 4702954). Japanese Patent No. 4702954 suggests performing an operation of removing sensor dust (sensor cleaning) when the power is turned off in order to prevent sensor dust from adhering for a long time.

Depending on an image capture apparatus, restart may be necessary when the operation mode is switched, or the like. When an operation of turning off the power and an operation of turning on the power are performed at the time of restart, performing sensor cleaning when the power is off may increase a time required for restart. Also in a case where sensor cleaning is performed when the power is turned on, a similar problem may occur.

SUMMARY OF THE INVENTION

In light of such an issue of conventional technologies, a mode of the present invention provides an image capture apparatus and a control method thereof that make it possible to prevent a decrease in the usability due to an operation of cleaning an image sensor.

According to an aspect of the present invention, there is provided an image capture apparatus capable of performing sensor cleaning for removing an unwanted object on an image capture plane of an image sensor, the apparatus comprising: one or more processors that execute a program stored in a memory and thereby function as: a detection unit configured to detect occurrence of an event accompanied by turning off a power, and a control unit configured to control the image capture apparatus, wherein, in a case where setting has been made such that the sensor cleaning is to be automatically performed when the power is turned off: if the event is a restart event, the control unit controls the image capture apparatus to perform restart processing without performing the sensor cleaning when the power is turned off, and if the event is not the restart event, the control unit controls the image capture apparatus to perform the sensor cleaning when the power is turned off.

According to another aspect of the present invention, there is provided a control method that is performed by an image capture apparatus capable of performing sensor cleaning for removing an unwanted object on an image capture plane of an image sensor, the method comprising: detecting occurrence of an event accompanied by turning off a power; and in a case where setting has been made such that the sensor cleaning is to be automatically performed when the power is turned off: if the event is a restart event, controlling the image capture apparatus to perform restart processing without performing the sensor cleaning when the power is turned off, and if the event is not the restart event, controlling the image capture apparatus to perform the sensor cleaning when the power is turned off.

According to a further aspect of the present invention, there is provided a non-transitory computer-readable medium that stores a program, when executed by a computer of an image capture apparatus capable of performing sensor cleaning for removing an unwanted object on an image capture plane of an image sensor, causes the computer to perform a control method comprising: detecting occurrence of an event accompanied by turning off a power; and in a case where setting has been made such that the sensor cleaning is to be automatically performed when the power is turned off: if the event is a restart event, controlling the image capture apparatus to perform restart processing without performing the sensor cleaning when the power is turned off, and if the event is not the restart event, controlling the image capture apparatus to perform the sensor cleaning when the power is turned off.

Further features of the present invention will become apparent from the following description of exemplary embodiments (with reference to the attached drawings).

DESCRIPTION OF THE EMBODIMENTS

Figure 1:
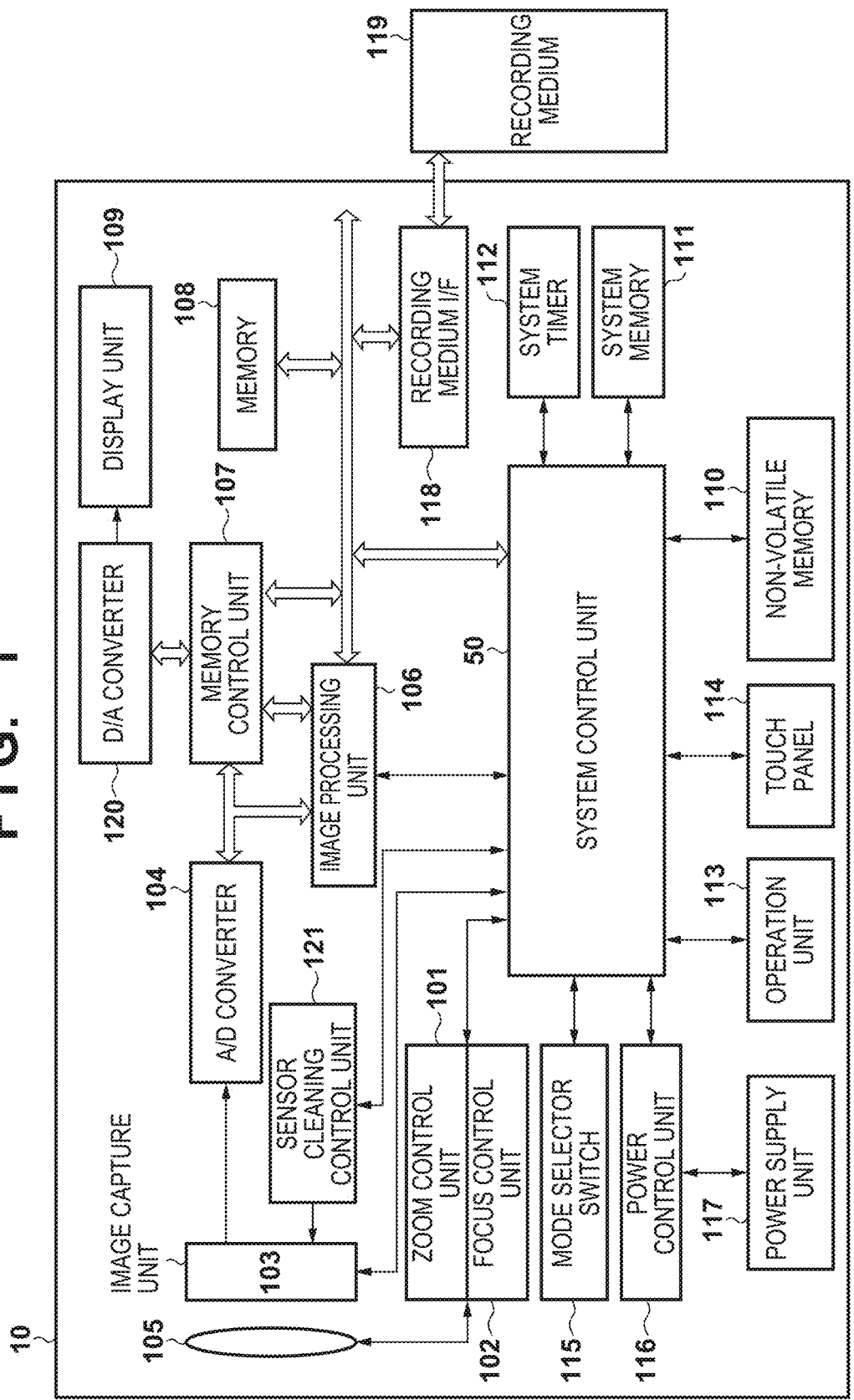
FIG. 1 is a block diagram showing a configuration example of a digital camera as an example of an image capture apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that, in the following embodiments, cases will be described in which the present invention is implemented as a digital camera. However, the present invention can be implemented as any electronic devices that have an image capturing function. Such electronic devices include video cameras, computer devices (personal computers, tablet computers, media players, PDAs, and the like), mobile phones, smart phones, gaming devices, robots, drones, and drive recorders. These are exemplary, and the present invention can also be implemented as another electronic device.

First Embodiment

FIG. 1 is a block diagram showing an exemplary functional configuration of a digital camera 10 that can implement the present invention. Functional blocks of the digital camera 10 may be realized by any of software, hardware, or a combination thereof, except for portions that can be realized only by hardware such as an image sensor, a non-volatile memory 110, and a system memory 111. Some of the functional blocks may be realized by dedicated hardware such as an ASIC (Application Specific Integrated Circuit), for example. In addition, some of the functional blocks may be realized by a processor such as a CPU performing a program stored in a memory. Note that, a plurality of functional blocks may be realized by a common configuration (for example, one ASIC). In addition, hardware that realizes some of the functions of a certain functional block may be included in hardware that realizes another functional block.

Imaging lenses 105 make up an optical system that forms an optical image of a subject on the image capture plane of the image sensor included in an image capture unit 103. The imaging lenses 105 may be in the form of an interchangeable lens, or may be fixed to the digital camera 10

The imaging lenses 105 include a plurality of lenses that include movable lenses. The movable lenses include a zoom lens and a focus lens, for example. The zoom lens changes the focal length (field of view) of the imaging lenses 105. Driving of the zoom lens is controlled by a system control unit 50 through a zoom control unit 101. The focus lens adjusts the focused distance of the imaging lenses 105. Driving of the focus lens is controlled by the system control unit 50 through a focus control unit 102.

The image capture unit 103 includes an image sensor, a drive circuit thereof, and the like. The image sensor may be a known CCD or CMOS color image sensor that has a color filter of a primary color Bayer array, for example. The image sensor includes a pixel array in which a plurality of pixels are two-dimensionally arranged, and a peripheral circuit for reading out signals from the pixels. The pixels each accumulate an electric charge that is based on an incident light amount, by performing photoelectric conversion. By reading out, from the pixels, signals having voltages that are based on electric charge amounts accumulated during an exposure period, a pixel signal group (analog image signals) expressing a subject image formed on the image capture plane is obtained.

The image capture unit 103 includes a cleaning mechanism for removing an unwanted object (in the present specification, referred to as "sensor dust") that may appear in an image captured by the image sensor. The cleaning mechanism is a mechanism for vibrating, at a high speed, members that make up a portion of the image sensor, and members provided on the front surface and in the vicinity of the image sensor, for example. The cleaning mechanism may be a mechanism for vibrating an optical filter or a covering glass, for example, or may be a mechanism for vibrating other members. The present invention does not depend on the configuration of the cleaning mechanism, and thus any known cleaning mechanism may be used.

Operations of the cleaning mechanism are controlled by the system control unit 50 through a sensor cleaning control unit 121.

An A/D converter 104 converts analog image signals output from the image capture unit 103 into digital image signals (image data).

An image processing unit 106 applies predetermined image processing to image data output by the A/D converter 104, generates signals or image data as usage, and obtains and/or generates various types of information. The image processing unit 106 may be a dedicated hardware circuit designed to realize a specific function such as an ASIC. Alternatively, the image processing unit 106 may be configured to realize a specific function by a processor such as a DSP (Digital Signal Processor) or a GPU (Graphics Processing Unit) performing software. The image processing unit 106 outputs obtained or generated information and data to the system control unit 50, a memory control unit 107, or the like, as usage.

Image processing that is applied by the image processing unit 106 may include preprocessing, color interpolation processing, correction processing, detection processing, data processing treatment, evaluation value calculation processing, and special effect processing, for example.

Preprocessing may include signal amplification, reference level adjustment, defective pixel correction, and the like.

Color interpolation processing is processing for interpolating a value of a color component that is not included in individual pieces of pixel data that make up image data, and is performed when a color filter is provided in the image sensor. Color interpolation processing is also called demosaic processing.

Correction processing may include processing such as white balance adjustment, gradation correction, correction (image recovery) of image deterioration caused by (optical) aberration of the imaging lenses 105, correction of influence of limb darkening of the imaging lenses 105, color correction, and the like.

Detection processing may include detection of a feature region (for example, a face region or a human body region) and movement thereof, processing for recognizing a person, and the like.

Data processing treatment may include processing such as extraction (trimming) of a region, combining, scaling, encoding and decoding, header information generation (data file generation), and the like. Generation of image data to be displayed and image data to be recorded is also included in data processing treatment.

Evaluation value calculation processing may include processing such as generation of a signal or an evaluation value used for automatic focus detection (AF), and generation of an evaluation value used for automatic exposure control (AE).

Special effect processing may include processing such as applying blur effect, changing the color tone, and re-lighting.

Note that these are exemplary processing that can be applied by the image processing unit 106, and do not limit processing that is applied by the image processing unit 106.

A memory 108 temporarily stores image data output by the A/D converter 104, image data that is being processed by the image processing unit 106, image data that has been generated by the image processing unit 106 and is to be displayed and/or to be recorded, data read out from a recording medium 119, and the like. A portion of the memory 108 is used as a video memory of a display unit 109.

The D/A converter 120 converts image data stored in the video memory region of the memory 108, into analog signals, and supplies the analog signals to the display unit 109. The image data stored in the video memory region of the memory 108 may be composite image data obtained by combining image data to be displayed and image data indicating setting values of the digital camera 10 and the like, or image data indicating a GUI display such as a menu display, for example.

The display unit 109 includes a liquid crystal display or an organic EL display, for example, and performs display that is based on analog signals from the D/A converter 120. By continuously capturing a moving image and displaying the captured moving image, it is possible to cause the display unit 109 to function as an electronic view finder (EVF). An operation for causing the display unit 109 to function as an EVF is referred to as a "live view display operation, and a moving image that is being live-view-displayed is referred to as a "live view image". Note that the display unit 109 may be an external apparatus different from the digital camera 10. In addition, there may be a plurality of display units 109.

The system control unit 50 is composed of one or more processors (a CPU, an MPU, a microprocessor, and the like) that can perform a program, for example. The system control unit 50 controls operations of the units of the digital camera 10 by loading a program stored in the non-volatile memory 110 to the system memory 111 and performing the program, and realizes functions of the digital camera 10. The system control unit 50 performs automatic exposure control (AE) and automatic focus detection (AF) operations using evaluation values generated by the image processing unit 106, for example. In addition, when an operation performed on an operation unit 113, a touch panel 114, or a mode selector switch 115 is detected, the system control unit 50 performs an operation that is based on the detected operation.

In addition, the system control unit 50 detects occurrence of an event registered in advance, and performs an operation that is based on the detected event. In the present embodiment, a power off event and a restart event are determined as events in advance. The power off event is an event that requires a power off operation to be performed, and includes an operation of turning off the power switch, satisfaction of a condition for performing an auto-power off function, and the restart event. The restart event is an event subordinate to the power off event, and is an event that requires a power off operation and a subsequent power on operation. In the present embodiment, an event accompanied by switching a program that is performed and requires restart is registered as the restart event. A case will be described later in which switching between a still image recording mode and a moving image recording mode is registered as the restart event, as an example.

The non-volatile memory 110 is electrically rewritable, and is an EEPROM, for example. The non-volatile memory 110 stores a program that is performed by the system control unit 50, various setting values of the digital camera 10, GUI data, and the like. In the present embodiment, some programs stored in the non-volatile memory 110 require the digital camera 10 to be restarted, when performed by the system control unit 50. When a program that is performed by the system control unit 50 is switched from a program for the still image recording mode to a program for the moving image recording mode, for example, the digital camera 10 needs to be restarted.

The system memory 111 is a main memory that is used when the system control unit 50 loads or performs a program. Note that the memory 108 and the system memory 111 may be different regions in the same memory space.

A system timer 112 measures times used for various types of control and a time of an incorporated clock in accordance with control by the system control unit 50. While the digital camera 10 is operating in the still image recording mode or a play mode, for example, the system control unit 50 calculates a period during which a user operation has not been detected using the system timer 112, and performs the auto-power off function when the time reaches a certain time. Note that the number of functional blocks for which supply of power is stopped due to the auto-power off function may be smaller than the number of functional blocks for which supply of power is stopped when an instruction to turn off the power is given by performing an operation on the power switch.

The operation unit 113 is an operating means for inputting various operation instructions to the system control unit 50. The operation unit 113 may include the power switch, a menu button, a cancel button, a cross key (an upward direction key, a downward direction key, a left direction key, and a right direction key), a SET key, an autofocus/manual focus switch button, and the like.

The touch panel 114 is provided on the display unit 109, for example. A so-called software key can be realized by combining image display of GUI parts (buttons, switches, and the like) on the display unit 109, and detection of an operation performed on the touch panel 114.

The mode selector switch 115 switches the operation mode of the digital camera 10. Note that the mode selector switch 115 may be included in the operation unit 113, or may be implemented as a software key realized using the touch panel 114. In the present embodiment, operation modes of the digital camera 10 include a still image recording mode, a moving image recording mode, and a play mode.

When an operation performed on the operation unit 113, the touch panel 114, or the mode selector switch 115 is detected, the system control unit 50 performs an operation that is based on the detected operation. When an operation performed on the menu button is detected, for example, the system control unit 50 causes the display unit 109 to display a menu display. In addition, when an operation performed on the cross key or the SET key is detected while the menu display is displayed, the system control unit 50 changes display of the menu display in accordance with the operation, or changes the settings of the digital camera 10 in accordance with display content of the menu display.

A power control unit 116 detects whether or not a battery has been attached, and a type and a residual amount of the attached battery. In addition, the power control unit 116 supplies appropriate power to each functional block, and stops supply of power, based on control of the system control unit 50. Note that the power control unit 116 can also stop supply of power to some of the functional blocks in order to reduce the consumed power. A power supply unit 117 is a battery, a battery pack, a power adaptor, or the like.

A recording medium I/F 118 is an interface to the recording medium 119 such as a memory card. Image data that has been generated by the image processing unit 106 and is to be recorded is stored in a data file in a predetermined format, and is recorded in the recording medium 119 by the system control unit 50 through the recording medium I/F 118. In addition, the system control unit 50 loads data recorded in the recording medium 119 to the memory 108 through the recording medium I/F 118.

Next, operations of the digital camera 10 according to the present embodiment when the power off event is detected will be described with reference to the flowchart in FIG. 2. Note that the operations shown in the flowchart in FIG. 2 can be realized by the system control unit 50 performing a program stored in the non-volatile memory 110. Note that at least some of the operations may be carried out by hardware different from the system control unit 50. Here, it is assumed that the digital camera 10 is operating in the still image recording mode, but the digital camera 10 may be operating in another operation mode.

In step S200, the system control unit 50 determines whether or not the occurrence of the power off event has been detected, performs step S201 if it is determined that the occurrence of the power off event has been detected, and repeatedly performs step S200 if not. As described above, the power off event is an event that requires a power off operation to be performed, and includes an operation of turning off the power switch, satisfaction of a condition for performing the auto-power off function, and the restart event.

In step S201, the system control unit 50 determines whether or not the detected power off event is the restart event, performs step S204 if it is determined that the detected power off event is the restart event, and performs step S202 if not. The restart event may be an operation of instructing that the mode be changed to the moving image recording mode, for example. Note that, when the digital camera 10 is operating in the moving image recording mode, an operation of instructing that the mode be changed to the still image recording mode corresponds to the restart event.

In step S202, the system control unit 50 instructs the sensor cleaning control unit 121 to perform sensor cleaning. In addition, the system control unit 50 displays a screen indicating that sensor cleaning is being performed, on the display unit 109. Note that, in a case where setting has been made such that sensor cleaning is not automatically performed when the power is turned off, the system control unit 50 displays, on the display unit 109, a warning screen for prompting the user to attach a lens cap, instead of instructing that sensor cleaning be performed in step S202.

In step S203, the system control unit 50 performs ending processing that is based on the current operation mode, such as storing a setting value. When the ending processing has been completed, the system control unit 50 instructs the power control unit 116 to turn off the power. Accordingly, the power control unit 116 stops power supply from the power supply unit 117 to functional blocks.

Note that the power control unit 116 may maintain power supply to some functional blocks, even when the power is turned off. In step S203, the system control unit 50 may display a screen indicating that power off processing is being performed, on the display unit 109. In this manner, if it is not determined that the power off event is the restart event, the system control unit 50 performs sensor cleaning for when the power is turned off, in accordance with the settings, and then performs power off processing.

On the other hand, if it is determined that the power off event is the restart event, the system control unit 50 performs restart processing that includes power off processing and power on processing.

Specifically, in step S204, the system control unit 50 performs power off processing without performing sensor cleaning, irrespective of the settings related to whether or not to automatically perform sensor cleaning when the power is turned off. The content of power off processing may be basically similar to step S203, but a configuration is adopted in which power on processing can be consecutively performed. In addition, the system control unit 50 changes the operation mode that is set for when restart is performed next time, and is stored in the non-volatile memory 110, for example, to the moving image recording mode. When instructing the power control unit 116 to turn off the power, the system control unit 50 adds an instruction to turn on the power after a certain period of time to power off processing, for example. This is an example, and it is possible to automatically turn on the power after the power has been turned off, using any other method.

In step S205, when the power control unit 116 starts to supply power in a power-source off state, the system control unit 50 performs power on processing. In power on processing, the system control unit 50 performs a program for the moving image recording mode, in accordance with the settings stored in the non-volatile memory 110.

Note that a configuration can be adopted in which, even in a case where setting has been made such that sensor cleaning is automatically performed when the power is turned on, sensor cleaning is not performed when the power is turned on at the time of restart. Specifically, in power off processing in step S204, a 1-bit flag indicating that the system control unit 50 is performing the restart event is set to a true value (for example, 1). The flag can be stored in the non-volatile memory 110, for example.

At the time of power on processing in step S205, the system control unit 50 references the flag stored in the non-volatile memory 110. Then, if the flag takes a value indicating that the restart event is being performed (true value), the system control unit 50 does not perform sensor cleaning, even in a case where setting has been made such that sensor cleaning is automatically performed when the power is turned on.

As described above, in the present embodiment, even in a case where setting has been made such that sensor cleaning is automatically performed, sensor cleaning for when the power is turned off is not performed when the power is turned off in order to restart. For this reason, it is possible to suppress an increase in the restart time due to sensor cleaning being performed. Accordingly, it is possible to improve the operability when an event that requires restart occurs. By adopting a configuration in which sensor cleaning for when the power is turned on is not performed at the time of restart, it is also possible to further shorten the restart time.

Second Embodiment

Next, a second embodiment of the present invention will be described. The present embodiment can be implemented as the digital camera 10, and is the same as the first embodiment except for operations when a power off event is detected. Therefore, a description of content that is same as that of the first embodiment is omitted.

Operations of the digital camera 10 according to the present embodiment when a power off event is detected will be described with reference to the flowchart in FIG. 3. Note that the operations shown in the flowchart in FIG. 3 can be realized by the system control unit 50 performing a program stored in the non-volatile memory 110. Note that at least some of the operations may be carried out by hardware different from the system control unit 50. Here, it is assumed that the digital camera 10 is operating in the still image recording mode, but the digital camera 10 may be operating in another operation mode. Note that, in FIG. 3, steps for performing the same operations as those of the first embodiment are given the same reference numerals as those in FIG. 2.

Figure 2:
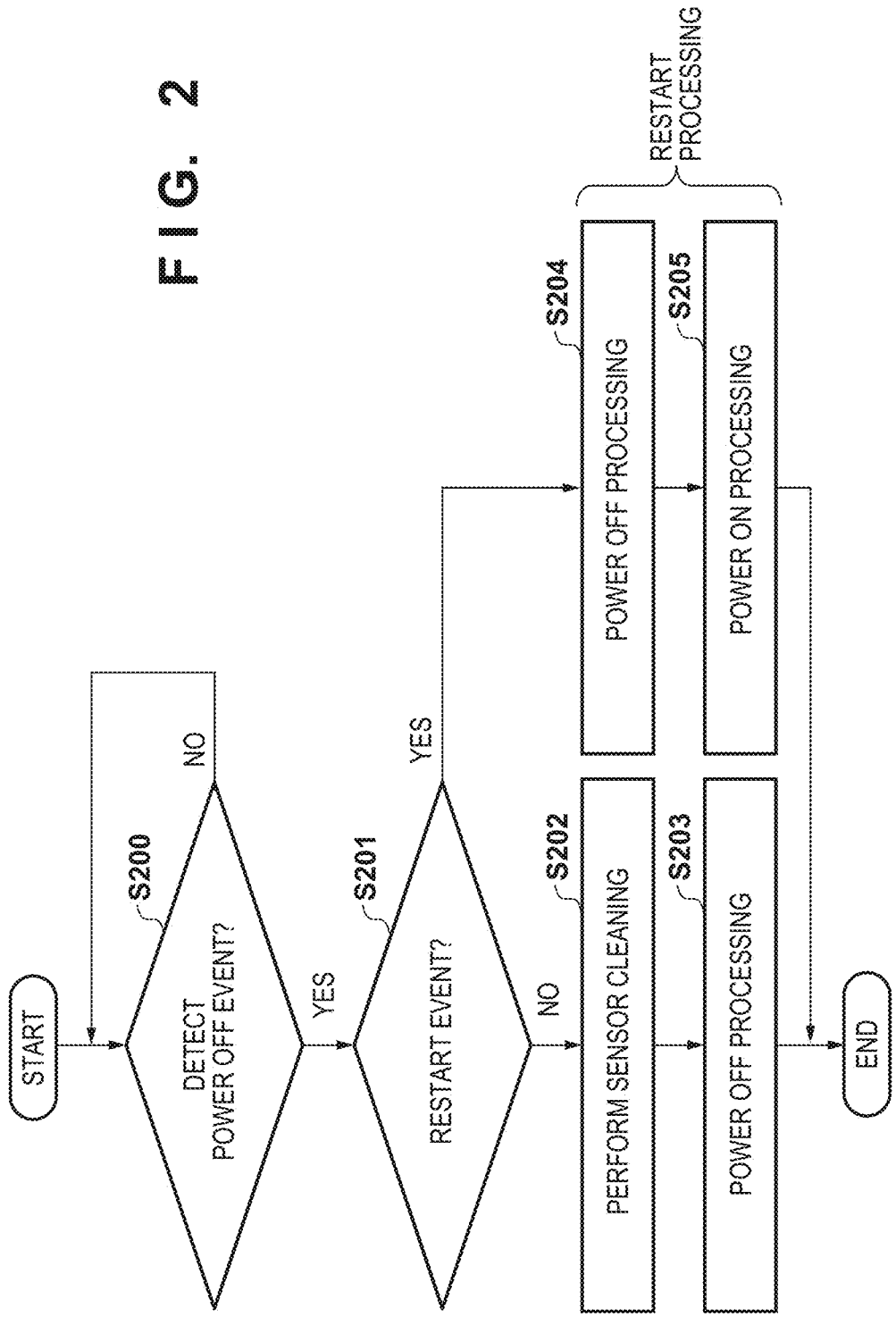
FIG. 2 is a flowchart related to operations when a power off event is detected according to a first embodiment.
Figure 3:
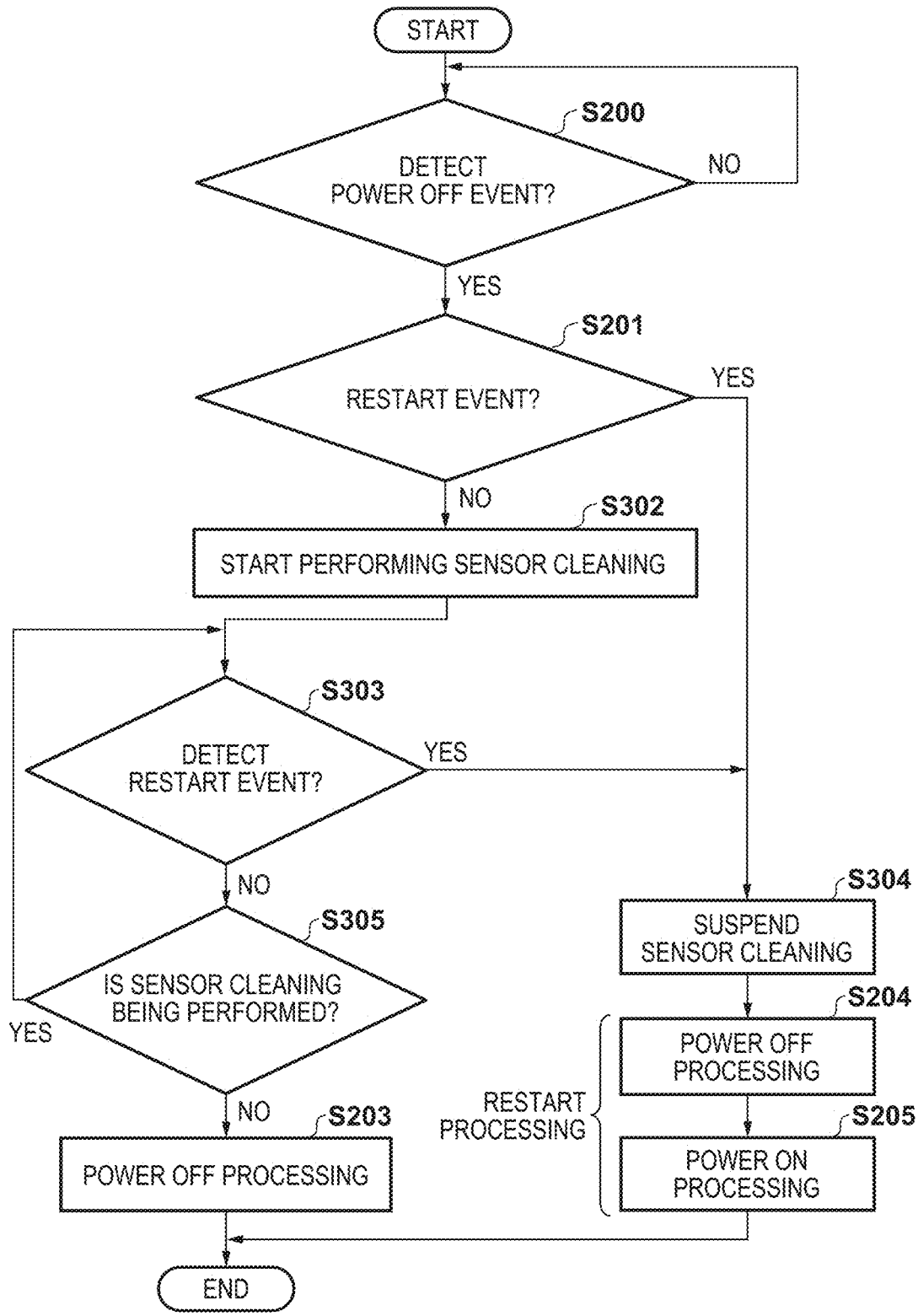
FIG. 3 is a flowchart related to operations when a power off event is detected according to a second embodiment.

As is clear from comparison between FIGS. 2 and 3, operations when the restart event is detected are the same as those of the first embodiment, and thus a description thereof is omitted. In step S201, if it is not determined that the power off event is the restart event, the system control unit 50 performs step S302.

In step S302, the system control unit 50 instructs the sensor cleaning control unit 121 to perform sensor cleaning. In addition, the system control unit 50 displays, on the display unit 109, a screen indicating that sensor cleaning is being performed. The system control unit 50 then performs step S303.

Note that, in a case where setting has been made such that sensor cleaning is not automatically performed when the power is turned off, the system control unit 50 displays, on the display unit 109, a warning screen for prompting the user to attach a lens cap, and performs step S203, instead of instructing that sensor cleaning be performed in step S302. In this case, steps S303 and S305 are not performed.

In step S303, the system control unit 50 determines whether or not the occurrence of the restart event has been detected, performs step S304 if it is determined that the occurrence of the restart event has been detected, and performs step S305 if not. Detection of the occurrence of the restart event can be performed in a similar manner to steps S200 and S201.

In step S305, the system control unit 50 determines whether or not sensor cleaning is being performed, performs step S303 if it is determined that sensor cleaning is being performed, and performs step S203 if not. If the sensor cleaning control unit 121 has not given a notification of sensor cleaning having been ended, for example, the system control unit 50 can determine that sensor cleaning is being performed.

In step S304, the system control unit 50 instructs the sensor cleaning control unit 121 to suspend sensor cleaning that is being performed. In addition, the system control unit 50 may display, on the display unit 109, a screen for notifying the user that sensor cleaning is to be suspended. Alternatively, when a screen for notifying the user that sensor cleaning is being performed is being displayed, the system control unit 50 may end display of the screen. The system control unit 50 then performs step S204.

According to the present embodiment, when occurrence of the restart event is detected while sensor cleaning for when the power is tuned off is being performed, sensor cleaning is suspended, and restart processing is performed. For this reason, for example, when the user instructs that the operation mode be changed, it is possible to immediately perform restart processing and change the operation mode without waiting for the power to be temporarily turned off.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-090208, filed May 31, 2023, which is hereby incorporated by reference herein in its entirety.

What is claimed is:

1. An image capture apparatus capable of performing sensor cleaning for removing an unwanted object on an image capture plane of an image sensor, the apparatus comprising:
    one or more processors that execute a program stored in a memory and thereby function as:
    a detection unit configured to detect occurrence of an event accompanied by turning off a power, and
    a control unit configured to control the image capture apparatus,
    wherein, in a case where setting has been made such that the sensor cleaning is to be automatically performed when the power is turned off:
        if the event is a restart event, the control unit controls the image capture apparatus to perform restart processing without performing the sensor cleaning when the power is turned off, and
        if the event is not the restart event, the control unit controls the image capture apparatus to perform the sensor cleaning when the power is turned off.

2. The image capture apparatus according to claim 1, wherein, even in a case where setting has been made such that sensor cleaning is automatically performed when the power is turned on, the control unit controls the image capture apparatus not to perform sensor cleaning when the power is turned on for restart.

3. The image capture apparatus according to claim 1, wherein the restart event occurs when an operation mode of the image capture apparatus is switched.

4. The image capture apparatus according to claim 3, wherein switching of the operation mode is switching between a still image recording mode and a moving image recording mode.

5. The image capture apparatus according to claim 1, wherein an event that is not the restart event is satisfaction of a condition for performing an auto-power off function or an operation of turning off a power switch.

6. The image capture apparatus according to claim 1, wherein, when occurrence of the restart event is detected while the sensor cleaning when the power is turned off is being performed, the control unit controls the image capture apparatus to suspend the sensor cleaning that is being performed, and to perform the restart processing.

7. The image capture apparatus according to claim 1, wherein, in a case where the event is not the restart event and setting has been made such that sensor cleaning is not automatically performed when the power is turned off, the control unit displays a warning screen on a display device of the image capture apparatus while power off processing is performed, and
wherein, in a case where the event is not the restart event and setting has been made such that sensor cleaning is automatically performed when the power is turned off, when occurrence of the restart event is detected while the sensor cleaning when the power is turned off is being performed, the control unit controls the image capture apparatus to suspend the sensor cleaning when the power is turned off that is being performed and to perform restart processing.

8. The image capture apparatus according to claim 1, wherein the image capture apparatus performs the sensor cleaning by vibrating the image sensor or a member provided in the vicinity of the image sensor.

9. A control method that is performed by an image capture apparatus capable of performing sensor cleaning for removing an unwanted object on an image capture plane of an image sensor, the method comprising:

detecting occurrence of an event accompanied by turning off a power; and in a case where setting has been made such that the sensor cleaning is to be automatically performed when the power is turned off:

if the event is a restart event, controlling the image capture apparatus to perform restart processing without performing the sensor cleaning when the power is turned off, and if the event is not the restart event, controlling the image capture apparatus to perform the sensor cleaning when the power is turned off.

10. A non-transitory computer-readable medium that stores a program, when executed by a computer of an image capture apparatus capable of performing sensor cleaning for removing an unwanted object on an image capture plane of an image sensor, causes the computer to perform a control method comprising:

detecting occurrence of an event accompanied by turning off a power; and in a case where setting has been made such that the sensor cleaning is to be automatically performed when the power is turned off:

if the event is a restart event, controlling the image capture apparatus to perform restart processing without performing the sensor cleaning when the power is turned off, and if the event is not the restart event, controlling the image capture apparatus to perform the sensor cleaning when the power is turned off.

* * * * *